Aug. 17, 1943.                L. A. McCOMB                2,327,282
                          PROCESSING APPARATUS
                   Filed July 26, 1941           4 Sheets-Sheet 3
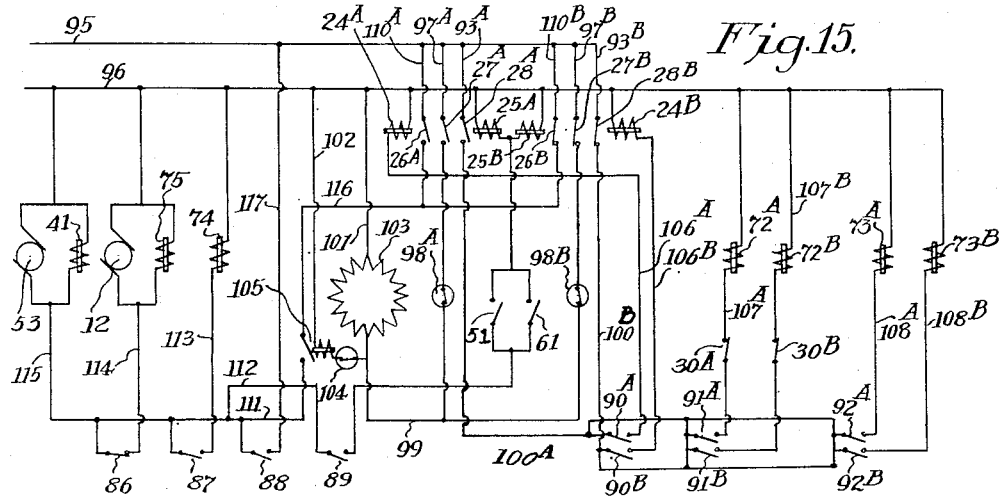
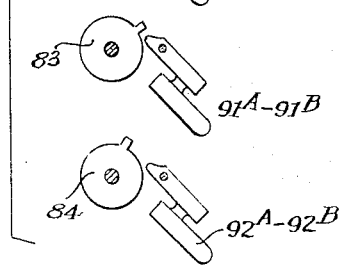
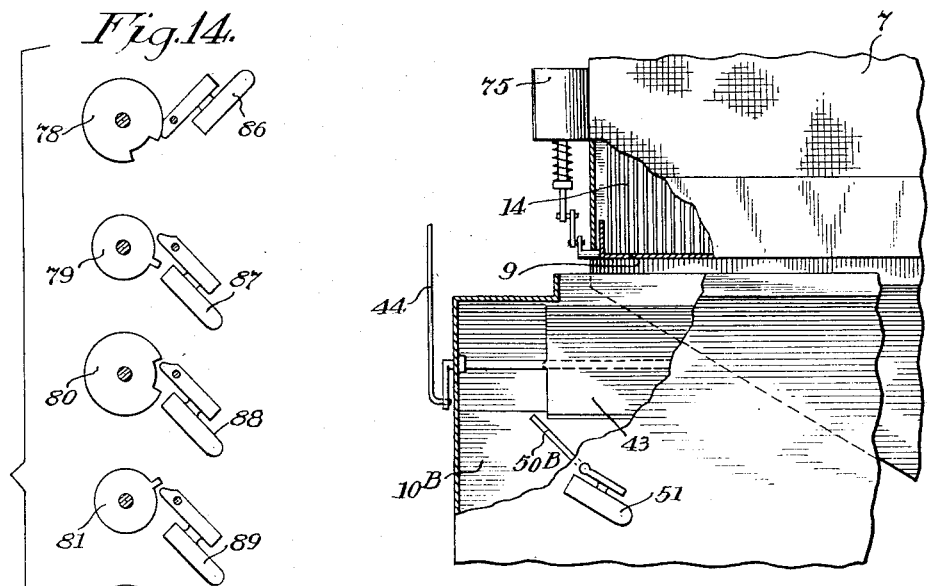
INVENTOR.
Lloyd A. McComb,
BY
              Attorney Aug. 17, 1943.  L. A. McCOMB  2,327,282
PROCESSING APPARATUS
Filed July 26, 1941     4 Sheets-Sheet 4
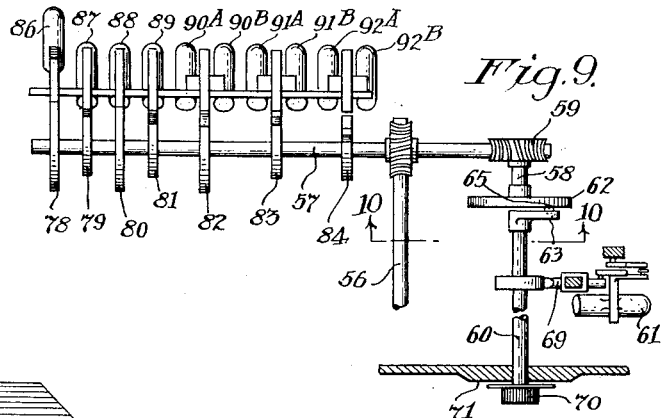
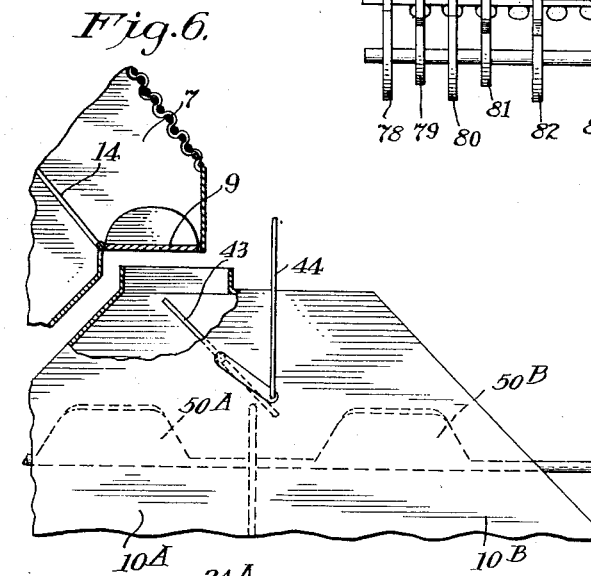
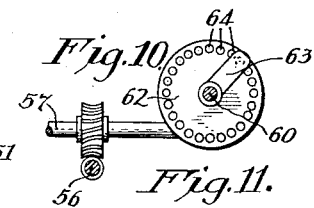
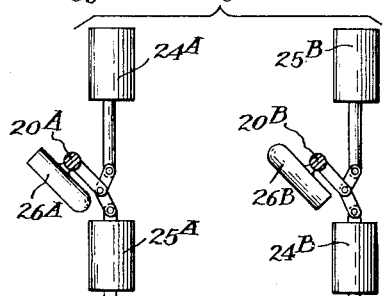
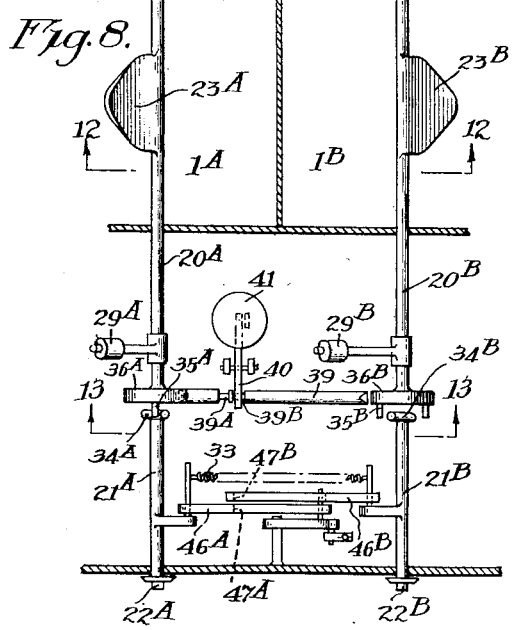
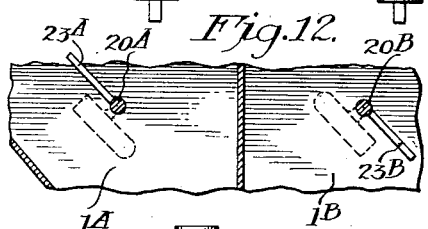
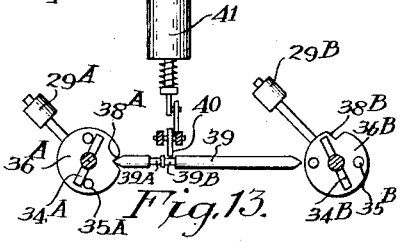
INVENTOR.
Lloyd A. McComb,
BY
Attorney Patented Aug. 17, 1943

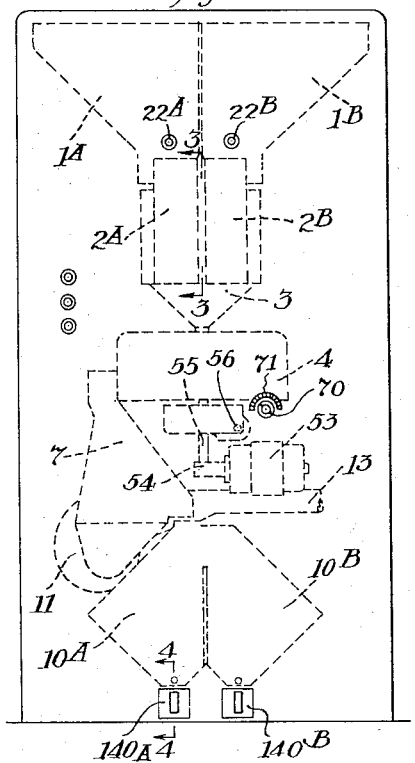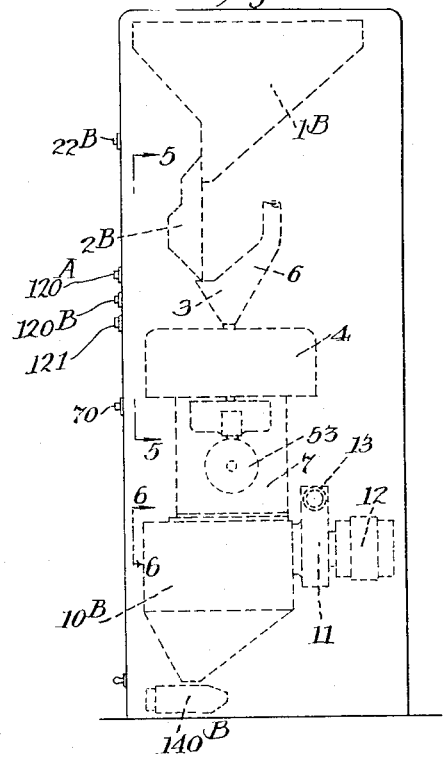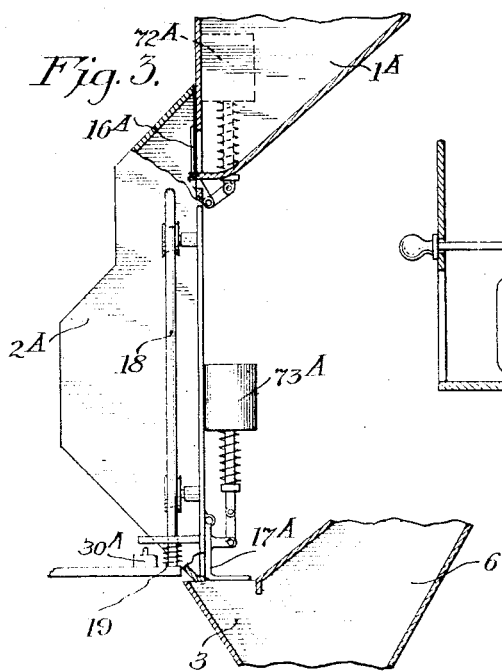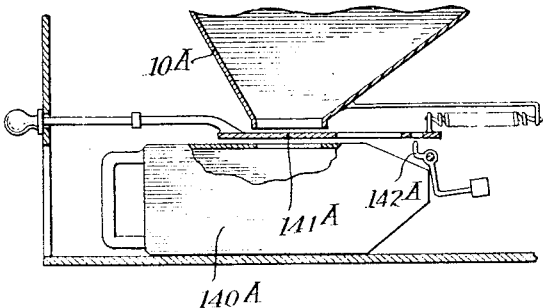

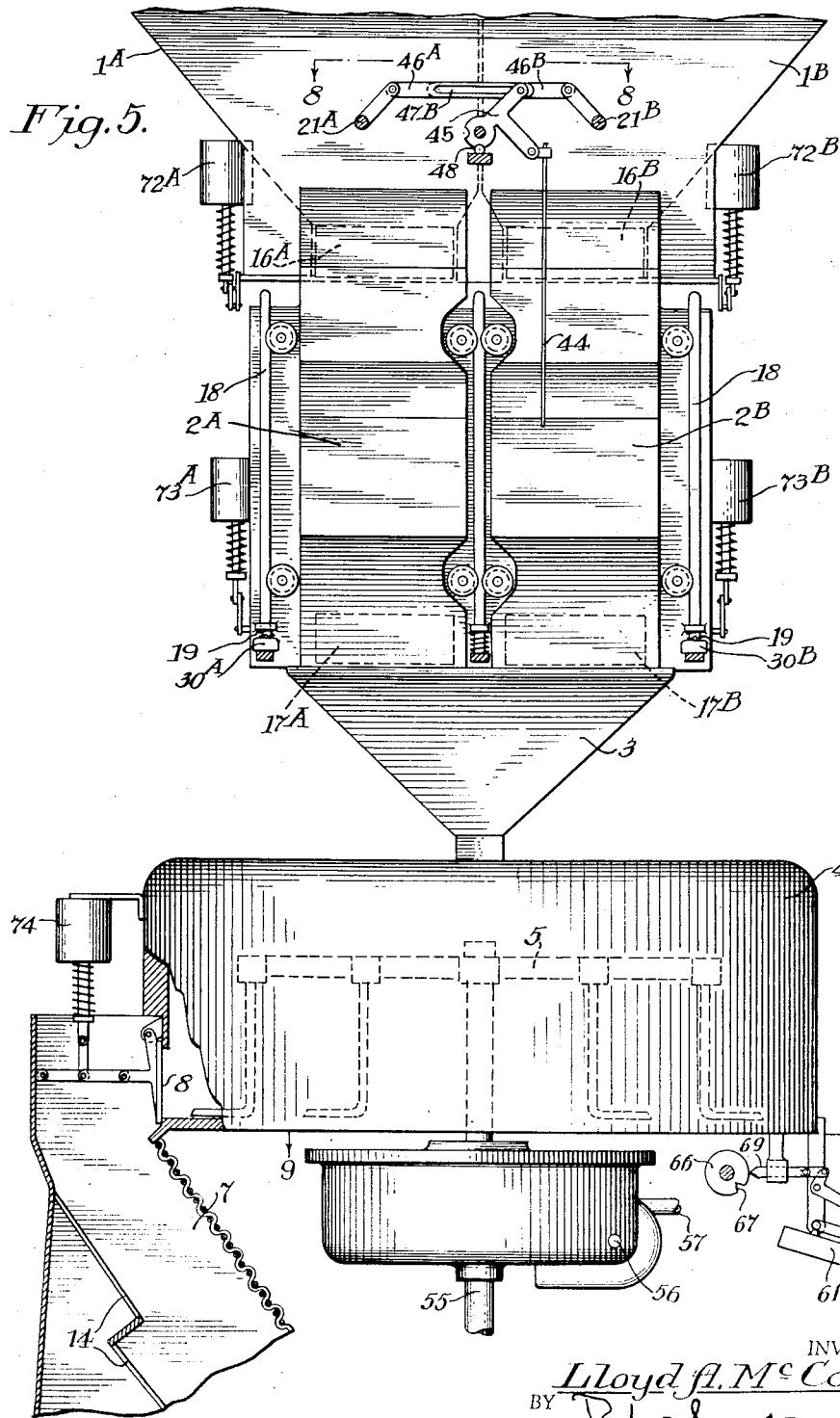

2,327,282

UNITED STATES PATENT OFFICE 2,327,282

PROCESSING APPARATUS

Lloyd A. McComb, Los Angeles, Calif., assignor to Brinck Engineering Company, Inc., Los Angeles, Calif., a corporation of California Application July 26, 1941, Serial No. 404,182

8 Claims. (Cl. 34—45)

This invention is a processing apparatus having a cyclic control for supplying material to and discharging it from a processing chamber, the invention being particularly applicable to a coffee roasting mechanism.

It is an object of the invention to automatically stop the apparatus after a predetermined number of cyclic operations, and at the will of the operator to select the number of cyclic operations which will be completed before the apparatus stops.

It is a further object of the invention to automatically stop the apparatus in the event of either depletion of material which is being supplied to the apparatus or predetermined accumulation of material which has been processed by the apparatus.

It is a still further object of the invention to automatically stop the apparatus after a predetermined number of cyclic operations, or to automatically stop the apparatus (short of this predetermined number of cyclic operations) in the event of either depletion of material which is to be processed, or predetermined accumulation of material which has been processed.

It is a still further object of the invention to supply material to the processing chamber at the start of each cycle of operation with the processing of each batch completed during the next succeeding cycle of operation; and when automatically stopping the apparatus (either by predetermined number of cycles having been completed, or depletion of material which is being supplied to the apparatus, or accumulation of material which has been processed), to supply no new material to the processing chamber at the start of the last cycle, but continue this last cycle to completion so as to finish the processing of the preceding batch of material.

It is a still further object of the invention to selectively supply the apparatus from different sources, and to separately collect the processed material in accordance with the respective sources of supply; and to provide a common means for controlling cyclic operation when employing any one of the sources of supply.

It is a still further object of the invention to lock the apparatus against shifting from one source of supply to another, except when the apparatus has been stopped and is clear of material.

It is a still further object of the invention to provide improved means for cleaning the processed material of chaff and the like, without the chaff clogging the apparatus.

It is a still further object of the invention to provide a discharge for the processed material which has collected, with the discharge locked in closed position except when a suitable receptacle has been alined therewith.

It is a still further object of the invention to supply measured batches of material to the processing chamber, with said measurement in accordance with weight of the material.

Further objects of the invention will be readily understood from the following description of the accompanying drawings, in which:

Fig. 1 is a front elevation of the apparatus.

Fig. 2 is a side elevation.

Figs. 3 and 4 are sections on the lines 3—3 and 4—4 respectively of Fig. 1.

Figs. 5 and 6 are vertical sections on the lines 5—5 and 6—6 respectively of Fig. 2.

Fig. 7 is a side elevation of the structure shown at Fig. 6.

Figs. 8 and 9 are horizontal sections on the lines 8—8 and 9—9 respectively of Fig. 5.

Fig. 10 is a vertical section on the line 10—10 of Fig. 9.

Figs. 11, 12 and 13 are vertical sections on the lines 11—11, 12—12 and 13—13 respectively of Fig. 8.

Fig. 14 is a diagram of the cams and switches of the automatic control.

Fig. 15 is a wiring diagram.

The material which is to be processed is contained in a supply hopper, from whence it is discharged in measured batches into a processing chamber, shown in the present instance as a coffee roaster. From the processing chamber the material is discharged into a second processing chamber, a cooler in the present instance, from whence it is discharged into a receiving hopper.

In the illustrated embodiment, two supply hoppers 1A—1B are shown, respectively discharging via measuring containers 2A—2B into a common conduit 3 which leads to the processing chamber 4. The processing chamber is shown as an electrically heated roaster, having agitating means 5 and vented as shown at 6.

A cooling chamber 7, which is the second processing chamber, communicates with the processing chamber 4 via a door 8, and discharges via a door 9 into one or the other of receiving hoppers 10A—10B. A fan 11 draws air through screen-walls of the cooling chamber, for cooling the processed material and removing chaff, etc. The fan is driven by a motor 12, and the air and chaff are withdrawn via a conduit 13, to a cyclone separator (not shown).

To prevent clogging by chaff, the screen-wall 14 upon which the processed material is supported as it gravitates through the cleaning chamber, is not a cross-mesh screen but comprises merely closely juxtaposited parallel strands extending in the direction of gravitational flow and having no cross strands. The restricted spaces between next adjacent strands prevent passage of processed material such as roasted coffee beans, while permitting free passage of chaff, etc., which due to the absence of cross-strands may be drawn through the screen-wall 14 without liability of clogging.

The measuring containers 2A—2B supply measured batches of material to the processing chamber 4; and preferably measure the batches of material by weight, as will insure more uniform processing than when measurement is by volume, particularly when roasting coffee.

As an instance, doors 16A—16B control passage of material from the hoppers 1A—1B to the respective measuring containers 2A—2B; and doors 17A—17B control discharge from the respective measuring containers to the conduit 3 and thence to the processing chamber 4. The containers 2A—2B are depressed responsive to predetermined weight of material, and for this purpose may be integrally connected and slidably mounted in guides 18 and may be yieldingly spring-elevated as shown at 19.

By adjusting the spring mountings the weight which will depress the containers may be adjusted; and responsive to depression of the containers by weight of material supplied to one or the other of the same, the intake door 16A or 16B (which has been opened for supplying material to the measuring container 2A or 2B) is reclosed so that predetermined weight of material will have been trapped in whichever measuring container has been supplied with material. This door-control is via electrical switches 30A—30B and thence via the control hereafter described, the switches 30A—30B being closed when the measuring-containers are elevated, and being engaged and opened responsive to depression of the measuring containers.

The hoppers 1A—1B are selectively employed for supplying material to the processing chamber 4 via the corresponding measuring container 2A or 2B; and when one of the supply hoppers and its corresponding measuring container has been selected, the other supply hopper and its measuring container are locked against operation.

As an instance, shafts 20A—20B are journaled in the respective hoppers 1A—1B, and are respectively rotatably adjusted by control shafts 21A—21B which are provided with operating knobs 22A—22B. Vanes 23A—23B project from the respective shafts 20A—20B, into the respective hoppers 1A—1B; and electrical solenoids 24A—24B (when energized) hold the shafts 20A—20B in rotatably adjusted position with their vanes 23A—23B projecting downwardly into the hoppers 1A—1B ("on" position); and electrical solenoids 25A—25B (when energized) rock the shafts 20A—20B to position with their vanes 23A—23B projecting from the shafts at an upward inclination ("off" position).

Electrical switches of the tilting type, e. g. mercury switches, are mounted on the shafts 20A—20B; the switches 26A, 27A and 28A being mounted on the shaft 20A and being open when this shaft is rocked to "off" position and being closed when the shaft is rocked to "on" position; and the switches 26B, 27B and 28B being mounted on the shaft 20B and being open when this shaft is rocked to "off" position and being closed when the shaft is rocked to "on" position.

Counterweights 29A—29B are provided on the respective shafts 20A—20B; the weight of 29A being less than the opposing weight of the solenoids 24A—25A so that the weight differential tends to rock the shaft 20A to "off" position; and the weight of 29B being greater than the opposing weight of solenoids 24B—25B so that the weight differential tends to rock the shaft 20B to "off" position.

When one or the other of the control shafts 21A—21B is turned to "on" position it turns its associated operating shaft 20A or 20B to "on" position, and when the control shaft is then released it is spring-returned from "on" position while its associated operating shaft remains in "on" position. As an instance, the control shafts 21A—21B are spring-connected as shown at 33; and cross-heads 34A—34B, which are fixed on the control shafts, cooperate with diametrically opposite clutch pins 35A—35B which project longitudinally from discs 36A—36B, these discs being fixed on the operating shafts 20A—20B.

Referring to Figs. 5, 8, 11, 12 and 13, the cooperating cross-heads and clutch pins are relatively positioned so that with an operating shaft in "off" position (as shown at shaft 20A), turning its control shaft to "on" position engages its cooperating cross-head and clutch pins so as to turn the operating shaft to "on" position. When an operating shaft is thus turned to "on" position and its control shaft is then released (as shown at shaft 20B), the control shaft is returned by the spring 33 from its "on" position, so that its cross-head swings clear of the cooperating clutch pins, thereby permitting the operating shaft to remain in "on" position, or to rock to "off" position independently of its control shaft. When an operating shaft, which has been thus turned to "on" position, is subsequently rocked to "off" position its cooperating cross-head and clutch pins are again relatively positioned (as shown at shaft 20A), ready for again turning the operating shaft to "on" position.

When one of the operating shafts 20A—20B is turned to "on" position, the other operating shaft is locked in "off" position. As an instance, the discs 36A—36B have cam notches 38A—38B, and responsive to turning either of the operating shafts to "on" position the cam notch of its disc engages one end of a bolt 39 so as to slide the bolt for locking its other end in the cam notch of the disc of the other operating shaft. The bolt is releasably held in one or the other of its shifted positions, so as to lock one or the other of the operating shafts in "off" position. This releasable engagement is shown as a dog 40 which is adapted to engage one or the other of annular grooves 39A—39B in the bolt 39, with the dog releasably projected to operative position by energizing an electrical solenoid 41.

The processed material which is discharged via the door 9 collects in one or the other of the hoppers 10A—10B, depending upon the position of a baffle 43; and this baffle is rocked for discharge into hopper 10A or 10B according to which of the shafts 20A—20B has been turned to "on" position. As an instance, the baffle 43 is rocked by a rod 44 which is connected to a bell-crank lever 45, and this bell-crank lever is rocked to one position or the other by links 46A—46B which are respectively linked to the shafts 21A—21B.

The bell-crank lever has slotted connections 47A—47B with the respective actuating links 46A—46B, whereby turning the control shaft 21A to "on" position and then releasing the same (for spring-return from its "on" position), rocks the lever 45 in one direction so as to swing the baffle 43 for discharge into the hopper 10A, and turning the control shaft 21B to "on" position and then releasing the same, rocks the lever 45 in the opposite direction so as to swing the baffle 43 for discharge into the hopper 10B. A spring catch 48 releasably retains the lever 45 in either of its operative positions, until positively rocked to its other position.

Means are preferably provided whereby filling either one of the hoppers 10A—10B to a predetermined level, actuates mechanism which is connected to the control hereinafter described. As an instance, vanes 50A—50B are pivoted in the respective hoppers 10A—10B, and are normally rocked to position opening a tiltable electrical switch 51. When either receiving hopper is filled to a predetermined level above its vane 50A or 50B, the weight of the processed material rocks the vane downwardly and thereby tilts the switch 51 to closed position.

Means are preferably provided for actuating the control, hereinafter described, whenever the apparatus has completed a selected number of cyclic operations. As an instance, a motor 53 drives gearing which is housed in a casing 54, and this gearing drives a shaft 55 which revolves the agitating mechanism 5, and also drives a shaft 56 which is geared to a cam shaft 57. The cam shaft drives a shaft 58 through worm gearing 59, and a control shaft 60 determines the distance which the shaft 58 turns before closing a tiltable electrical switch 61.

For this purpose, the shafts 58—60 are axially alined, and a disc 62 is fixed on the shaft 58, and a crank 63 is fixed on the shaft 60. The disc 62 has circumferentially spaced recesses 64, any one of which is adapted for engagement by a spring projected ball 65 on the crank 63. A cam 66 is fixed on the shaft 60 and is notched at 67, and switch 61 is actuated by a spring-urged pin 69, so that when the notch 67 alines with the pin the latter is spring projected for tilting the switch to closed position, and when the notch is turned to a position out of alinement with the pin, the cam 66 retracts the pin against the tension of its spring and retains the pin in retracted position, thereby tilting the switch 61 to open position until the notch 67 again alines with the pin.

At each complete revolution of the cam shafts 57, which determines one complete cycle of operation, the gearing 59 turns the shaft 58 a distance equal to that between a pair of next adjacent recesses 64, thereby correspondingly turning the shaft 60 through the driving connection which is formed by the ball 65 having been seated in one of the recesses 64. A knob 70 is provided for turning the shaft 60, and a dial 71 cooperates with an index marking of the knob and is calibrated in "Number of roasts," with the spacing of the graduations corresponding to the spacing of the recesses 64, and with the zero or "off" graduation positioned so that when the index marking of the knob is alined therewith, the shaft 60 is turned to position alining the notch 67 with the pin 69.

Before starting the apparatus, the knob 70 is turned to a selected number of roasts as indicated on the dial 71, thereby turning the shaft 60 so that the cam 66 retracts the pin 69 and opens the switch 61. Turning the shaft 60 also turns the crank 63 relative to the disc 62, the disc being held against turning by the worm gearing 59, and the ball 65 yielding to permit relative turning of the crank and disc; and when the shaft 60 has been turned to the dial graduation indicating the selected "Number of roasts," the ball 65 seats in the corresponding recess 64. The knob 70 being then released and the apparatus started, the cam shaft 57 rotates the shafts 58—60 (which are connected at 64—65) so that for each complete revolution of the cam shaft 57 the shafts 58—60 are turned a distance equal to that between a pair of next adjacent recesses 64, and when the cam shaft has completed a number of revolutions corresponding to the setting of the knob 70, the shafts 58—60 will have been turned to position again alining the index marking of the knob 70 with the zero or "off" graduation of its dial, in which position the notch 67 alines with the pin 69, thereby closing the switch 61 and actuating the control mechanism as hereinafter described.

A plurality of cams, constituting the control mechanism of the apparatus, are fixed on the cam shaft 57, and a plurality of tiltable electrical switches are pivoted alongside the cams and are actuated thereby. These switches control the motors and the various solenoids previously described, and also control solenoids 72A—72B—73A—73B—74—75. The solenoids 72A—72B, when energized, respectively open the doors 16A—16B; the solenoids 73A—73B, when energized, respectively open the doors 17A—17B; the solenoid 74, when energized, opens the door 8; and the solenoid 75, when energized, closes the door 9. When their solenoids are deenergized, the doors 16A, 16B, 17A, 17B and 8 are closed, and the door 9 is opened, preferably by spring means as indicated at the respective solenoids.

The cams of the shaft 57, and their associated switches and the motors and solenoids controlled thereby, are as follows:

| Cam | Switch | Circuit |
| --- | --- | --- |
| 78 | 86 | Motor 12 and Solenoid 75. |
| 79 | 87 | Solenoid 74. |
| 80 | 88 | Motor 53 and Solenoid 41. |
| 81 | 89 | Solenoid 25A and Solenoid 25B. |
| 82 | 90A / 90B | Solenoid 24A. / Solenoid 24B. |
| 83 | 91A / 91B | Solenoid 72A. / Solenoid 72B. |
| 84 | 92A / 92B | Solenoid 73A. / Solenoid 73B. |

The cams are positioned on the shaft 57 for relatively opening and closing their associated switches in the following order, the letters O and C respectively indicating open and closed position of each switch, and the time during which each switch is respectively open and closed being indicated by the position of the letters with relation to a cycle of operation, as indicated by 0°————360°:

| Cam | Switch | 0°　　　Cycle of operation　　　360° |
| --- | --- | --- |
| 80 | 88 | O - C ———————————————— O |
| 81 | 89 | O - - C - O —————————————— |
| 83 | 91A or 91B | O - - - C - O ——————————— |
| 82 | 90A or 90B | O - - - - - C ———————————— O |
| 84 | 92A or 92B | O - - - - - - - C - O ——————— |
| 78 | 86 | C —————————————— O - C - - - |
| 79 | 87 | O —————————————————— C - O |

An instance of the electrical wiring for the apparatus is shown at Fig. 15. Current supply is via leads 95—96. Leads 97A—97B are connected to the lead 95, and respectively include the switches 27A—27B and thermostatic switches 98A—98B. The leads 97A and 97B are connected to a lead 99, and this lead is connected to parallel leads 101—102, which are connected to the lead 96. The lead 101 includes a heating element 103 for the processing chamber 4, and the lead 102 includes a thermostatic switch 104 and the electro-magnet of a relay 105.

Leads 93A—93B are connected to the lead 95, and respectively include the switches 28A—28B. The leads 93A—93B are respectively connected to leads 100A—100B. The lead 100A is connected to parallel leads 106A—107A—108A which are connected to the lead 96, and the lead 100B is connected to parallel leads 106B—107B—108B which are also connected to the lead 96. The leads 106A—106B respectively include the switches 90A—90B, with the solenoids 24A—24B in series with the respective switches. The leads 107A—107B respectively include the switches 91A—91B, with the solenoids 72A—72B in series with the respective switches, and with the switches 30A—30B also in series with the respective switches 91A—91B and their associated solenoids 72A—72B. The leads 108A—108B respectively include the switches 92A—92B, with the solenoids 73A—73B in series with the respective switches.

Leads 110A—110B are connected to the lead 95 and respectively include the switches 26A—26B. The leads 110A—110B are connected (via a lead 116 and the switch of the relay 105) to a lead 111; and a shunt-lead 117 also connects the lead 95 with the lead 111, via the switch 88. The lead 111 is connected to parallel leads 112—113—114—115, which are connected to the lead 96.

The lead 112 includes the switch 89, in series with the switches 51—61 which are parallel, and with the parallel switches 51—61 in series with the solenoids 25A—25B which are parallel. The lead 113 includes the switch 87, in series with the solenoid 74. The lead 114 includes the switch 86, in series with the motor 12 and the solenoid 75 which are parallel; and the lead 115 includes the solenoid 41 and the motor 53 which are parallel.

The operation of the apparatus is as follows:

Assuming both shafts 20A—20B in "off" position (as shown at shaft 20A), the weight differentials at 24A—25A as opposed to 29A, and at 29B as opposed to 25A—25B, balance the weight of material in the hoppers 1A—1B exerted on the upwardly tilted vanes 23A—23B, so that the shafts 20A—20B remain in "off" position. The switches 26A—27A—28A and the switches 26B—27B—28B are thus open, thereby breaking all circuits so that the apparatus remains at rest, with the cam shaft 57 in the position shown at Fig. 14.

To prepare for operation, the knob 70 is set so that the shaft 57 will make a selected number of complete rotations, i. e. a selected number of batches will be processed, before the notch 67 alined with the pin 69 to stop operation of the apparatus. The thermostatic switch 98A or 98B (depending upon whether material is to be supplied from hopper 1A or 1B) is set to maintain predetermined temperature in the processing chamber 4; and the normally closed thermostatic switch 104 is set to open when the processing chamber has been heated to its predetermined temperature. The thermostatic switches 98A—98B—104 are respectively controlled as shown at 120A—120B—121 (Fig. 2).

If material is to be supplied from hopper 1A and collected in hopper 10A the apparatus is started by turning the knob 22A to "on" position, or if material is to be supplied from hopper 1B and collected in hopper 10B the apparatus is started by turning the knob 22B to "on" position. Operation via hoppers 1B—10B will be described, the operation via 1A—10A being the same except for substitution of the exponent A for the exponent B.

The hopper 1B having been filled with an ample supply of the material which is to be processed, and the hoppers 10A—10B having been emptied to levels whereby the vane 50 is rocked to normal position opening the switch 51, and the spring means 19B having been adjusted so that a predetermined weight of material will depress the measuring hopper 2B; the knob 22B is turned to "on" position. This rocks the shaft 20B to "on" position, whereupon the knob 22B is released and is spring-returned from its "on" position. There being an ample supply of material in the hopper 1B, the weight thereof on the now substantially horizontal vane 23B retains the shaft 20B in "on" position as shown in the drawings; whereas if there has not been ample supply of material in the hopper 1B, the weight differential at 29B as opposed to 24B—25B would have returned the shaft 20B to "off" position and the apparatus would not operate.

Turning the shaft 21B to "on" position rocks the bell crank lever 45 by the link connection 46B, and the spring catch 48 then retains the lever in this rocked position when the shaft 21B is subsequently spring-returned from its "on" position, the slotted connection 47B permitting this retraction of the shaft 21B without reversely rocking the lever 45. Rocking the lever 45 by the link connection 46B shifts the rod 44 so as to swing the baffle 43 to position for discharge into the receiving hopper 10B, and for shutting off discharge into the hopper 10A.

Rocking the shaft 20B to "on" position shifts the bolt 39 so that it engages the notch 38A and locks the shaft 20A in "off" position, in order that there may be no operation via hoppers 1A—10A as long as the apparatus operates via hoppers 1B—10B.

Rocking the shaft 20B to "on" position, with the shaft then retained in this position by weight of ample material in the hopper 1B, closes the switches 26B—27B—28B, as indicated at the wiring diagram (Fig. 15).

Closing the switch 27B energizes the heating element 103 via 27B—98B—99—101; closing the switch 26B prepares for energizing the circuit 116—111—115 when the switch of the relay 105 is closed; and closing the switch 28B prepares for closing the circuits 106B—107B—108B when their switches 90B—91B—92B are closed.

Energizing the heating element 103 heats the processing chamber 4 to perdetermined temperature as controlled by thermostatic switch 98B. The electro-magnet of the relay 105 is also energized via the normally closed thermostatic switch 104, thereby opening the switch of the relay until the processing chamber 4 has been preheated to the predetermined operating temperature, whereupon the thermostatic switch 104 opens, thereby deenergizing the electro-magnet of the relay 105 so that its switch closes and remains closed as long as the processing chamber remains heated to operating temperature.

Closing the switch of the relay 105 energizes the solenoid 41 and the motor 53 via the circuit 116—111—115. The energized solenoid 41 thus locks the dog 40 in the groove 39B so as to retain the bolt 39 in position locking the shaft 20A in "off" position; and the energized motor 53 operates the agitating means 5 and starts rotation of the cam shaft 57. Closing the switch of the relay 105 also energizes the motor 12 and the solenoid 75 via the circuit 116—111—86—114, thereby starting the cooling fan 11 and closing the gate 9, but this performs no function at this stage since as yet there is no processed material in the cooler 7.

Rotation of the cam shaft 57 causes the following cyclic operation:

The cam shaft first closes the switch 88 and retains it closed to the end of the cycle. This closed switch connects the leads 117—111, so that circuits may be completed via 112—113—114—115, even if the switch 26B or the switch of the relay 105 should open. The circuit 115 thus remains closed for energizing the motor 53 and continuing rotation of the cam shaft 57. The cam shaft then closes the switch 89, but this performs no function at this stage since switches 51—61 are open.

The cam shaft then closes the switch 91B, thereby energizing the solenoid 72B via the circuit 107B (the switch 30B being normally closed). The door 16B is thus opened and material is supplied to the measuring container 2B, thereby depressing the measuring container and opening the switch 30B when the measuring container has received predetermined weight of material. Opening the switch 30B breaks the circuit for the solenoid 72B, so that the door 16B recloses, thereby trapping a measured weight of material in the container 2B.

The cam shaft then successively reopens the switches 89 and 91B, and then closes the switch 90B and retains it closed to the end of the cycle. The closed switch 90B energizes the solenoid 24B via the circuit 106B, thereby holding the shaft 20B in "on" position and thus maintaining the switches 26B—27B—28B closed to the end of the cycle.

The cam shaft then closes and then reopens the switch 92B. The solenoid 73B is thus energized via the circuit 108B and is then deenergized, thereby opening and then reclosing the door 17B; and while the door is open the measured weight of material in the container 2B is discharged into the processing chamber 4.

The material is then processed in the chamber 4, and near the end of its cycle of rotation the cam shaft opens and then recloses the switch 86. This deenergizes and then again energizes the motor 12 and the solenoid 75 via the circuit 114. The fan 11 is thus stopped and then restarted, and the door 9 is opened and then recloses, but this performs no function at this stage since as yet there is no material for discharge from the cooling chamber 7.

The cam shaft then closes and then reopens the switch 87. The solenoid 74 is thus energized via the circuit 113 and is then deenergized, thereby opening and then reclosing the door 8; and while the door is open the material which has been processed in the chamber 4 is discharged into the cooling chamber 7.

This completes a cycle of rotation, at which time the cam shaft opens the switches 88 and 90B. Opening the switch 88 breaks the connection between the leads 117—111, and opening the switch 90B breaks the holding circuit 106B. However, the switches 26B—27B—28B remain closed, due to ample weight of material exerted on the vane 23B for retaining the shaft 20B in "on" position.

A second cycle of operation thus starts, since the closed switch of the relay 105 energizes the motor 53 via the circuit 116—111—115; and this second cycle of operation continues to completion as above described. During this second cycle the material which has been processed in the chamber 4 and discharged into the cooler 7 during the first cycle, is cooled by the fan 11, and just before the end of the second cycle is discharged into the hopper 10B when the door 9 is opened. The cooler having thus been cleared of material from the first cycle of operation, the material which has been processed in the chamber 4 during the second cycle of operation is discharged into the cooler when the door 8 is opened at the end of this second cycle.

Cycles of operation thus follow one another, with the material which is discharged from the chamber 4 into the cooler 7 at the end of each cycle, cooled in the chamber 7 during the next succeeding cycle and then discharged into the receiving hopper 10B just before the end of the cycle.

This cyclic operation continues until (1) the material in the hopper 1B is so depleted that it is insufficient to supply a full batch of material to the measuring container 2B, or (2) the receiving hopper 10B is filled to a level above the vane 50B, or (3) the apparatus completes that number of cyclic operations for which the knob 70 has been set. Any one of these happenings stops supply of material to the processing chamber 4, but continues operation of the apparatus until the cooler 7 has been cleared of the last batch of material which has been discharged from the processing chamber.

This will be readily understood by noting that depletion of material in the hopper 1B will occur while material is being supplied to the measuring container 2B, at which time the switch 90B is opened and the solenoid 24B is deenergized; filling the hopper 10B to a level above the vane 50B will occur while material is discharging from the cooler 7, at which time the switch 89 is open; and alinement of the notch 67 with the pin 69 will occur at completion of the number of cycles of operation for which the knob 70 has been set, at which time the switch 89 is open.

Upon depletion of material in the hopper 1B, with the holding solenoid 24B deenergized, the weight differential (between the counterweight 28B and the solenoids 24B—25B) overbalances the reduced weight of material on the vane 23B so as to rock the shaft 20B to "off" position, thereby opening the switches 26B—27B—28B. Upon filling the hopper 10B to a level above the vane 50B, the weight of the material rocks the vane so as to close the switch 51; and upon completion of the number of cycles for which the knob 70 has been set so that the notch 67 alines with the pin 69, this pin is spring-projected for closing the switch 61.

Closing either the switch 51 or 61 produces no immediate effect since switch 89 is open. Rotation of the cam shaft 57 thus continues and the next cycle of operation starts. Just after the start of this new cycle the cam shaft closes the switch 89. The solenoid 25B is thus energized via the circuit 112, which is closed at either the switch 51 or 61; and at this time the switch 90B is open so that the holding solenoid 24B is deenergized. The energized solenoid 25B thus rocks the shaft 20B to "off" position, thereby opening the switches 26B—27B—28B.

Opening the switches 26B—27B—28B as above described, i. e. by depletion of material in the hopper 1B, or by filling the hopper 10B, or by completing the number of cycles of operation for which the knob 70 has been set, occurs before the switch 92B closes to energize the solenoid 73B, i. e. at a time when the batch of processed material of the preceding cycle has been discharged into the cooler 7, but before the batch of material of the current cycle has been discharged into the processing chamber 4. Opening the switch 27B deenergizes the heating element 103; opening the switch 28B breaks the circuits 106B—107B—108B; and opening the switch 26B breaks the circuit 116—111—115, even though the switch of the relay 105 remains closed. However, the switch 88 is closed when the switches 26B—27B—28B are opened. Therefore the leads 117—111 are connected. The motor 53 thus remains energized via the circuit 117—88—111—115, thereby continuing rotation of the cam shaft 57.

This continued rotation of the cam shaft maintains the switch 88 closed, thereby continuing rotation of the cam shaft to the end of the cycle. As above described, if the switches 26B—27B—28B have been opened responsive to depletion of material in the hopper 1B, the switch 91B will have closed and energized the solenoid 72B and thereby opened the door 16B before the switches 26B—27B—28B open, so that a partial batch of material is in the container 2B. If the switches 26B—27B—28B have been opened responsive to filling the hopper 10B or completing the number of cycles for which the knob 70 has been set, rotation of the cam shaft 57 closes the switch 91B after the switches 26B—27B—28B have opened, and consequently the solenoid 72B is not energized (the switch 28B being open), and the door 16B does not open for supplying material to the container 2B.

Regardless of which happening has opened the switches 26B—27B—28B, continued rotation of the cam shaft 57 then closes the switch 90B, but the circuit 106B is broken at the open switch 28B and therefore the solenoid 24B is not energized. Consequently the shaft 20B is not rocked to "on" position, and the switches 26B—27B—28B are not reclosed.

Continued rotation of the cam shaft then closes and then reopens the switch 92B, but the circuit 108B is broken at the open switch 28B and therefore the solenoid 73B is not energized. Consequently the door 17B is not opened and no material is supplied to the processing chamber 4.

In the meantime, the closed switch 83 has maintained the motor 12 and the solenoid 75 energized, so that the processed material of the preceding batch is cooled in the chamber 7; and as the cam shaft approaches the end of its cycle of rotation it opens (and then recloses) the switch 86, thereby deenergizing the solenoid 75 and opening the door 9 so that the cooled material is discharged into the hopper 10B. Completion of the cycle of rotation of the cam shaft then closes the switch 87. The solenoid 74 is thus energized via 117—88—111—113, thereby opening the door 8, but this performs no function since there is now no batch of processed material in the chamber 4.

The end of the cycle of rotation of the cam shaft then opens the switches 88—90B—87. The circuits 114 and 115 are thus opened, thereby deenergizing the motors 12 and 53 and stopping all operation, with all processed material collected in the hopper 10B, and with the parts again in the position first described, ready for again operating the apparatus.

The processed material which has been collected in the hoppers 10A—10B may be withdrawn via sliding receptacles 140A—140B, which are positioned below the discharge spouts of the respective hoppers. Sliding baffles 141A—141B are normally spring-retracted to close these discharge spouts, and may be manually actuated for opening the respective spouts. Latches 142A—142B cooperate with the respective baffles; and when the receptacles 140A—140B are in place to receive material from the hoppers, they extract the latches so that the baffles may be opened, but when either receptacle is withdrawn it releases its associated latch so that it gravitates to position locking the associated baffle against opening. Consequently, the baffles cannot be opened, unless the receptacles are in place to receive the material.

I claim:

1. In combination: a processing chamber having an intake and a discharge; a timer movable through successive cycles; means for moving the timer; operating means controlled by the timer for successively opening the intake and the discharge during each of said cycles; a control movable to operative position; means for stopping movement of the timer responsive to movement of the control to operative position; a driving connection connected to the timer for moving moving the control toward operative position proportionally to movement of the timer; and means for preadjusting the driving connection so that the control is moved to operative position by the timer at completion of movement of the latter through a selected number of cycles.

2. In combination: a supply hopper; a processing chamber having an intake from the supply hopper; a discharge from the processing chamber; a timer movable through successive cycles; means for moving the timer; operating means controlled by the timer for successively opening the intake and the discharge during each of said cycles; a control movable to operative position; means for stopping movement of the timer responsive to movement of the control to operative position; a driving connection connected to the timer for moving the control toward operative position proportionally to movement of the timer; means for preadjusting the driving connection so that the control is moved to operative position by the timer at completion of movement of the latter through a selected number of cycles; and means controlled by predetermined depletion of material in the supply hopper for stopping movement of the timer short of said selected number of cycles.

3. In combination: a processing chamber having an intake; a receiving hopper; a discharge from the processing chamber to the receiving hopper; a timer movable through successive cycles; means for moving the timer; operating means controlled by the timer for successively opening the intake and the discharge during each of said cycles; a control movable to operative position; means for stopping movement of the timer responsive to movement of the control to operative position; a driving connection connected to the timer for moving the control toward operative position proportionally to movement of the timer; means for preadjusting the driving connection so that the control is moved to operative position by the timer at completion of movement of the latter through a selected number of cycles; and means controlled by predetermined accumulation of material in the receiving hopper for stopping movement of the timer short of said selected number of cycles.

4. In combination: a measuring container having an intake and a discharge; a valve controlling the intake; a valve controlling the discharge; a processing chamber communicating with the discharge; a timer movable through successive cycles; means for moving the timer; operating means controlled by the timer for opening the intake valve and then opening and closing the discharge valve during each of said cycles; and means controlled by the timer and actuated by predetermined weight of material in the measuring container for closing the intake valve during each of said cycles at a time prior to the operating means opening the discharge valve.

5. In combination: supply hoppers; a processing chamber having an intake from each supply hopper; a valve controlling each intake; a discharge from the processing chamber; a valve controlling the discharge; a timer movable through successive cycles; driving means for the timer; means for operating the valves; and means for adjusting the operating means so as to select any one of the intake valves for operation; the operating means being controlled by the timer for successively opening the selected intake valve and the discharge valve during each of said cycles.

6. In combination: supply hoppers; a processing chamber having an intake from each supply hopper; a valve controlling each intake; a discharge from the processing chamber; a valve controlling the discharge; a timer movable through successive cycles; driving means for the timer; means for operating the valves; means for adjusting the operating means so as to select any one of the intake valves for operation; the operating means being controlled by the timer for successively opening the selected intake valve and the discharge valve during each of said cycles; and means controlled by the timer whereby except at completion of movement of the latter through each of said cycles the adjusting means is locked against selecting a different intake valve for operation.

7. In combination: supply hoppers; a processing chamber having an intake from each supply hopper; a valve controlling each intake; a discharge from the processing chamber; a valve controlling the discharge; a timer movable through successive cycles; driving means for the timer; means for operating the valves; means for adjusting the operating means so as to select any one of the intake valves for operation; the operating means being controlled by the timer for successively opening the selected intake valve and the discharge valve during each of said cycles; means controlled by the timer whereby except at completion of movement of the latter through each of said cycles the adjusting means is locked against selecting a different intake valve for operation; and means controlled by the timer whereby except at completion of movement of the latter through each of said cycles operation of the driving means is maintained.

8. In combination: supply hoppers; a processing chamber having an intake from each supply hopper; a valve controlling each intake; a discharge from the processing chamber; a valve controlling the discharge; a timer movable through successive cycles; driving means for the timer; means for operating the valves; means for adjusting the operating means so as to select any one of the intake valves for operation; the operating means being controlled by the timer for successively opening the selected intake valve and the discharge valve during each of said cycles; receiving hoppers associated with the respective intake valves; and means controlled by the adjusting means for connecting the discharge with the receiving hopper which is associated with the selected intake valve.

LLOYD A. McCOMB.